United States Patent [19]
Hoke, Jr.

[11] Patent Number: 5,852,486
[45] Date of Patent: Dec. 22, 1998

[54] LIQUID CRYSTAL DISPLAY WITH ALTERNATIVE ELECTRODE STRUCTURE

[76] Inventor: Clare L. Hoke, Jr., 1318 N. Monte Vista Ave., Suite 11, Upland, Calif. 91786

[21] Appl. No.: 774,462

[22] Filed: Dec. 30, 1996

[51] Int. Cl.$^6$ ................................. G02F 1/1339
[52] U.S. Cl. ............................ 349/156; 349/139
[58] Field of Search ................... 349/139, 156, 349/42

[56] References Cited

U.S. PATENT DOCUMENTS 4,264,149  4/1981  De Zwart et al. .
4,850,681  7/1989  Yamanobe et al. .
5,694,188  12/1997  Sano et al. .
5,719,653  2/1998  Minato et al. .

*Primary Examiner*—William L. Sikes
*Assistant Examiner*—James Dudek

[57] ABSTRACT

A liquid crystal display employing a novel electrode structure, wherein electrodes are removed from the substrates of the liquid crystal display. Vertical barrier members are employed within the liquid crystal display and consist in part or in total of data source lines, gate lines, drain means, appropriate insulating layers, contacts, and opposing electrodes.

17 Claims, 3 Drawing Sheets

LIQUID CRYSTAL DISPLAY WITH ALTERNATIVE ELECTRODE STRUCTURE

BACKGROUND OF THE INVENTION

1. Field of Invention

The present invention relates to liquid crystal displays. Specifically discussed is an alternative structure, whereby display clarity, contrast, resolution and stability are enhanced.

2. Description of Prior Art

Liquid crystal displays exploit the ability of liquid crystals to change from a well defined crystal structure to an intermediate liquid crystal state at their melting points. Liquid crystal materials are categorized by their characteristic phase transition ranges: nematic, smetic and cholestiric; with the former usually being preferred in displays for reasons of sensitivity of response to external stimuli, optical anisotropy, fluidity, and temperature range.

In the normal state (no voltage or heat applied) liquid crystal molecules align themselves into helical columns. As voltage is applied the molecules are forced into a random condition. A liquid crystal cell utilizes light polarizing materials wherein light is rotated upon entering the cell, and the lights ability to pass through said cell is determined by the phase of the liquid crystal encountered therein.

A liquid crystal cell is typically comprised of a linear polarizer, a glass substrate, a transparent conductive substance such as idium-tin oxide which form electric pathways and display segment electrodes, an alignment layer, liquid crystal, a second alignment layer, a further transparent conductive layer, a second glass substrate and a second linear polarizer. These layers are typically arranged parallel to each other in a sandwich fashion.

The three basic operating modes for a liquid crystal include reflective, transflective and transmissive. The most common is reflective which utilizes a reflector and does not require a backlight. The transflective mode uses a backlight and a reflector, while the transmissive mode does not use a reflector, but relies entirely on a backlight for adequate contrast.

The LCD pattern may consist of any variety of shapes, graphic images, or numbers. The process of establishing the LCD pattern begins with a clear conductive continuous coating on the the substrate which is coated with photo resist, the display is imaged by exposure, etched and then stripped of the photo resist to yield the LCD pattern. Alternate to this technique is the use of thin film transistors, which employ a grid or active matrix of liquid crystal pixels, which may be accessed electrically to produce varying patterns. The apertures of individual pixels in an active matrix liquid crystal display are constrained greatly by the interconnects (source bus lines and gate bus lines) and contacts.

At present LCD displays promise to replace the cathode ray tube in short order; and hold the potential of new and novel display applications. LCD's may be used for stable, low power, cost effective displays, and the industry is currently attempting to include large scale and high resolution as common descriptions of the LCD's virtues. To this end the present invention will show its potential beyond existing technology.

SUMMARY OF THE INVENTION

Accordingly, several objects and advantages of the present invention include:

(a) increased stability of LCD displays.
(b) improved LCD clarity in the reflective mode.
(c) improved LCD clarity in the transflective mode.
(d) improved LCD clarity in the transmissive mode.
(e) higher resolution LCD displays.
(f) improved resolution in large scale LCD displays.
(g) increased contrast for LCD displays.
(h) a reduction of defective LCD displays in manufacture.
(i) the ability to produce stable non flat LCD displays

DESCRIPTION OF THE PREFERRED EMBODIMENTS

Figure 1:
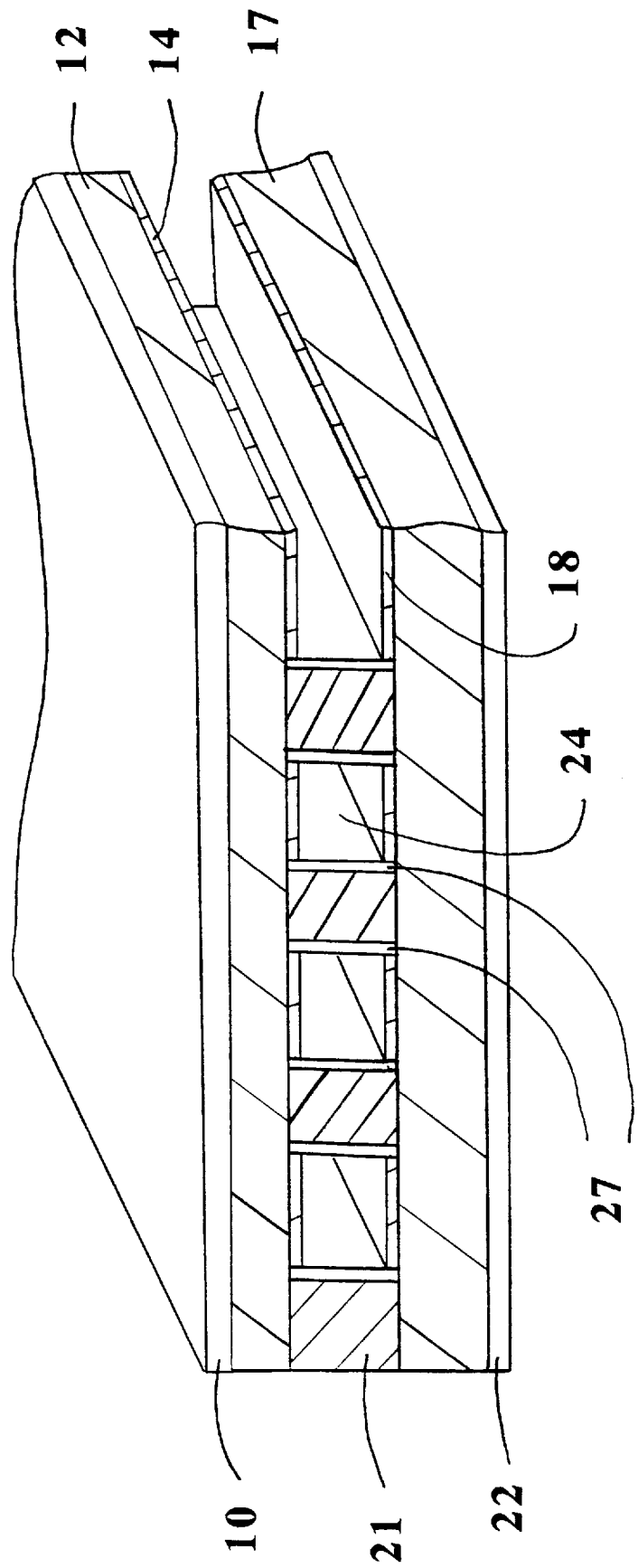
FIG. 1 is a perspective cross sectional view of the internal structure of a LCD display according to the present invention.

FIG. 1 shows a cross sectional perspective of the preferred embodiment of the present invention. Herein is a liquid crystal display, comprising a pair of substrates, 12 and 17 at least one of which is transparent, an orientation film formed on at least one of the two substrates 14 (and 18) and a plurality of vertically barrier members 21 positioned between said substrates. Polarizing layer 10 is laminated above glass substrate 12, as is polarizing layer 22 laminated beneath substrate 17.

Vertical barrier members 21 are best set in parallel and at ninety degrees to said substrates, excluding applications where the display is curved or set in full or in part at a substantial angle to the position of the viewer as might be the case of a windshield. The substrates and vertical barrier members form rectilinear regions 24, into which liquid crystal is extruded and encapsulated. Electrodes 27 are attached to each side of vertical barrier members 21 and may be comprised of indium-tin oxide, silicone, or any other suitable material. In effect the vertical barrier sections consist of electrode (27) barrier (21) electrode (27) as seen in FIG. 1.

Figure 3:
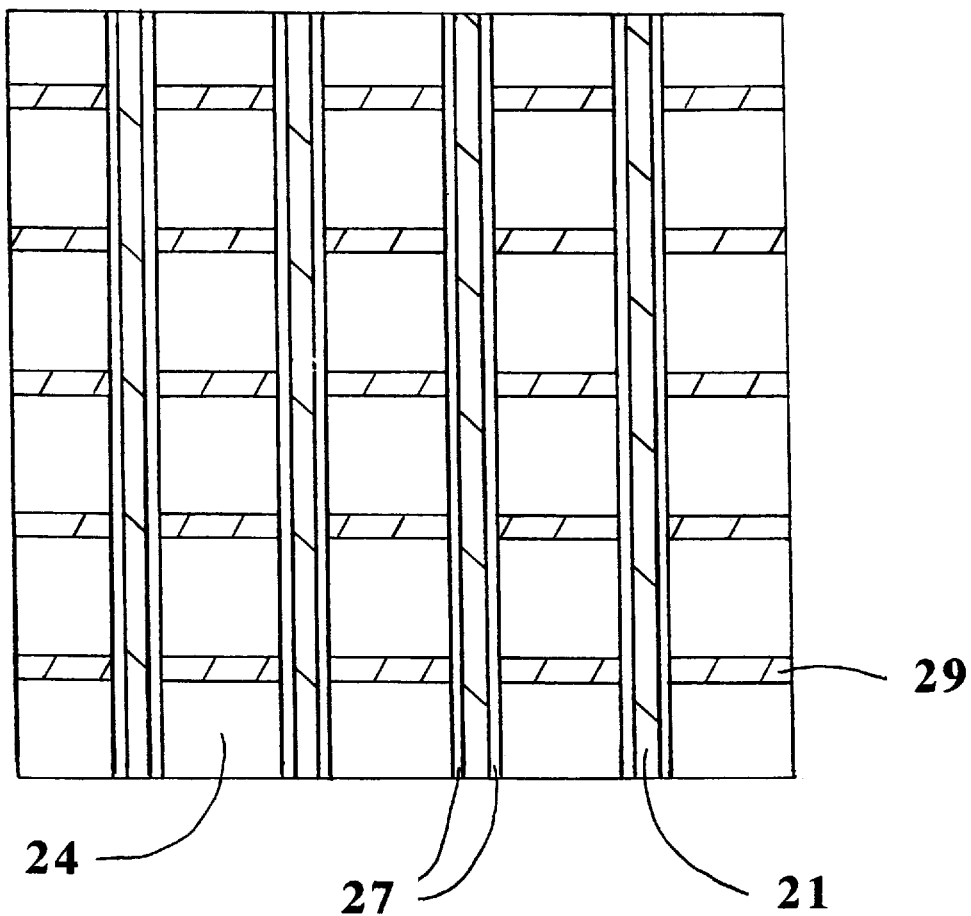
FIG. 3 is an elevational view of the present invention wherein a second array of vertical barrier members are introduced to separate individual liquid crystal pixels.

In the instance wherein pixel separation is desired, as in an active matrix transistor array, rectilinear regions 24 may be further subdivided, as seen in FIG. 3. Though it is possible to physically introduce further vertical barrier members at substantially ninety degrees to barrier members 21, it is herein suggested that barrier members 29 be introduced photo actively, or by means of laser, should the liquid crystal be in fact formed of a polymeric substance containing a non liquid crystal component in the side chain thereof, wherein reaction to heat or light serves to separate out said non liquid crystal material for the purpose of creating barrier members 29.

The virtues of removing said electrodes from the substrates 12 and 17 in a liquid crystal display are many. Clarity is increased when viewing the display in the transparent mode. The aperture of the liquid crystal may be increased in the case of active matrix transistor displays. By placing vertical barrier members at substantially ninety degrees to the displays substrates, the structural integrity of the entire display is increased; and stresses may be removed from the electrodes themselves, for increased electrical stability by mounting them on the displays vertical barrier members.

In manufacture, the increased stability and electrical dependability of the present invention lends itself to solving many manufacturing problems, and makes practical large functional displays. For example it is herein suggested that the present invention be employed in the manufacture of liquid crystal safety glass. The present invention is capable of withstanding the pressures of adhering substrate 12 to a plasticized polyvinyl butyral sheet, and a further pre formed layer of glass in a non autoclave process, wherein the pressures generated by a vacuum press, and heat applied to laminate said plasticized polyvinyl butyral sheet and said further pre formed layer of glass are not sufficient to damage a liquid crystal display as described in the present invention. Further it is implied herein that in accordance with the present invention, the component parts of a liquid crystal display, substrates and vertical barrier members, may be pre shaped themselves, before assembly, into non flat surfaces as would be desirable for the uses of safety glass material, or other types of displays.

Figure 2:
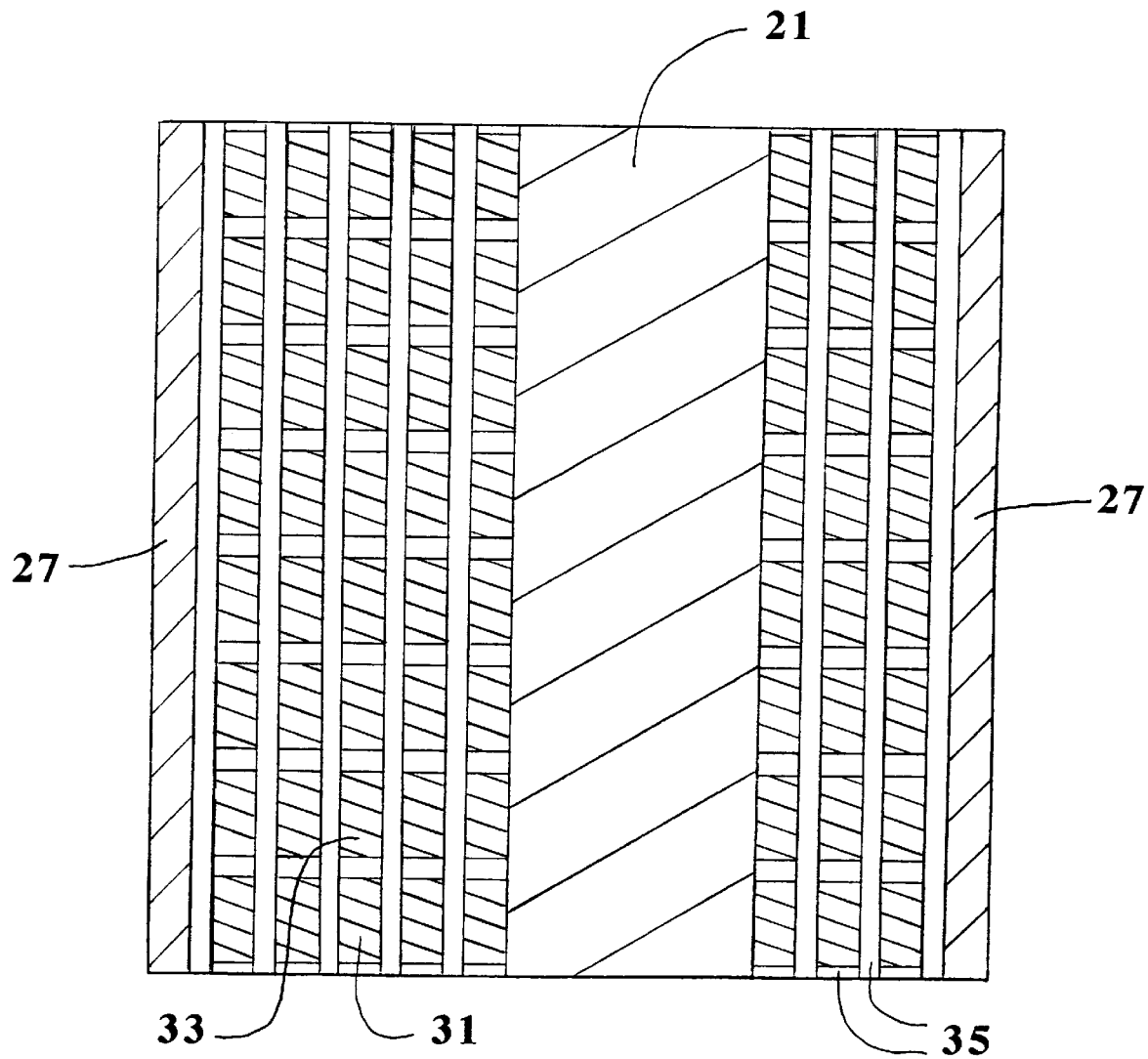
FIG. 2 shows a cross sectional end view of the vertical barrier members of the present invention.

When producing an active matrix liquid crystal display, data source lines, gate lines, drain means, appropriate insulating layers, and contacts, as well as electrodes 27 may be attached to vertical barrier members 21. In accordance with the present invention, in some applications vertical barrier members 21 may consist either in part, or in total, of data source lines, gate lines, drain means, appropriate insulating layers, contacts, and electrodes. FIG. 2 depicts a cross sectional end view of vertical barrier members 21, wherein data source lines 31, gate lines 33, insulating layers 35, and electrodes 27 are exposed.

In accordance with the present invention it is also possible that any or none of the source lines, gate lines, or contacts may be arrayed in a traditional manner, ie. in a planar fashion upon said substrates, and be brought into electrical contact with electrodes 27, upon vertical members 21.

What I claim is:

1. A liquid crystal display comprised of:

a pair of substrates, at least one of which is transparent, a plurality of vertical barrier members positioned between and at substantial angles to said substrates upon which data source lines, gate lines, drain means, appropriate insulating layers, contacts, and opposing electrodes are formed, an alignment layer attached to at least one of said substrates, and liquid crystal material encapsulated between said substrates, and said vertical barrier members.

2. A liquid crystal display described in claim 1, wherein:

said vertical barrier members consist in part or in total of said data source lines, gate lines, drain means, appropriate insulating layers, contacts, and opposing electrodes.

3. A liquid crystal display described in claim 1, wherein:

any or all of said data source lines, gate lines, drain means, or contacts, may be attached to one or both of said substrates; also being in electrical contact with said electrodes attached to said vertical barrier members.

4. A liquid crystal display described in claim 3, wherein:

a second array of vertical barrier members is established at substantial angles to first said vertical barrier members.

5. A liquid crystal display described in claim 1, wherein:

said plurality of data source lines, gate lines, drain means, and contacts may be formed of metal, silicone, silicone crystal, amorphous silicon, indium tin oxide, polysilicon, or a refractory metal silicide.

6. A liquid crystal display as described in claim 1, wherein:

said substrates and vertical barrier members are pre formed to produce a non flat display.

7. A liquid crystal display described in claim 1, wherein:

said liquid crystal display is structurally capable of being laminated to a plasticized polyvinyl butyral sheet, or other suitable material, and a further pre formed layer of glass.

8. A liquid crystal display described in claim 3, wherein:

said liquid crystal display is structurally capable of being laminated to a plasticized polyvinyl butyral sheet, or other suitable material, and a further pre formed layer of glass.

9. A liquid crystal display described in claim 3, wherein:

a contactless architecture is utilized.

10. A liquid crystal display described in claim 4, wherein:

the switching voltage of each pixel is adjusted by the length to width ratio of the thin film transistors.

11. A liquid crystal display described in claim 1, wherein:

said liquid crystal consists of a liquid crystal vinyl monomer with a non-liquid crystal vinyl monomer in the side chain thereof.

12. A liquid crystal display described in claim 3, wherein:

color filters are employed.

13. A liquid crystal display described in claim 3, wherein:

said liquid crystal is of a polymer network, or a polymer dispersed liquid crystal group.

14. A liquid crystal display described in claim 3, wherein:

said liquid crystal consists of ferroelectric or antiferroelectric liquid crystal material.

15. A liquid crystal display described in claim 13, wherein:

said vertical barrier members consist in part or in total of said data source lines, gate lines, drain means, appropriate insulating layers, contacts, and opposing electrodes.

16. A liquid crystal display described in claim 14, wherein:

said vertical barrier members consist in part or in total of said data source lines, gate lines, drain means, appropriate insulating layers, contacts, and opposing electrodes.

17. A liquid crystal display comprised of:

a pair of substrates, at least one of which is transparent, a plurality of vertical barrier members positioned between and at substantial angles to said substrates and consisting of data source lines, gate lines, drain means, appropriate insulating layers, contacts, and opposing electrodes, an alignment layer attached to at least one of said substrates, a liquid crystal material encapsulated between said substrates and said vertical barrier members, wherein said liquid crystal is a guest-host type of liquid crystal.

* * * * *